Jan. 28, 1969    W. A. HESKE    3,424,008
PNEUMATIC TRANSMITTER APPARATUS
Filed Sept. 26, 1966    Sheet 1 of 2

W. A. Heske
INVENTOR
BY John E. Toupal
ATTORNEY.

United States Patent Office 3,424,008
Patented Jan. 28, 1969

3,424,008
PNEUMATIC TRANSMITTER APPARATUS
William A. Heske, Fairfield, Conn., assignor to Dresser Industries, Inc., Stratford, Conn., a corporation of Delaware
Filed Sept. 26, 1966, Ser. No. 581,797
U.S. Cl. 73—411
Int. Cl. G01l 7/04
18 Claims

ABSTRACT OF THE DISCLOSURE

A pneumatic transmitter operative in response to changes in a variable condition to provide a remotely utilized correlated pneumatic signal. The transmitter includes a movement producing condition responsive member on which a vane is movably supported interposed in an air stream between axially aligned nozzles. The nozzles are movable by a pneumatic signal in a force balance system in response to pressure changes incurred by movement of the vane.

---

This invention relates generally to a pneumatic system which provides, in response to a variable condition, a proportional air pressure signal for operating indicating, recording or control devices. More particularly, the invention relates to such a pneumatic system exhibiting reduced susceptibility to the mechanical wear and unreliability produced in conventional transmitters by environmentally introduced mechanical vibrations.

Well known are pneumatic transmitter devices which produce an air signal proportional to a sensed variable condition such as temperature, pressure, differential pressure, flow, displacement, etc. The produced air signal can then be used at some remote location for either a measurement or control operation. Prior transmitter devices have included, for example, nozzle-flapper pneumatic amplifiers in which a flapper element is adapted for axial movement adjacent a discharge nozzle so as to vary the pressure therein in response to changes in a variable condition. These nozzle-flapper pneumatic amplifier devices have suffered from numerous disadvantages including low sensitivity, proneness to mechanical wear and calibration shift, requirements for extremely small nozzle orifices subject to clogging, etc.

Also known are pneumatic transmitters which utilize a vane member movable between axially aligned discharge and receiving nozzles in response to changes in a given variable condition. Movement of the vane varies the pressure which is transmitted from the discharge nozzle to the collector nozzle and this variable pressure is used to provide the desired measurement or control operation. Additional devices of this type include feedback arrangements which effect movement of the axially aligned nozzles in response to changes in the collector nozzle pressure whereby the transmitter can function as an error detector which measures differences in the positions of the vane and nozzle elements. These latter devices also have been subject to certain problems resulting primarily from their requirements for relatively sensitive bearing assemblies which support their various moving parts. The deterioration of the bearing assemblies and their sensitivity to mechanical vibration cause significant problems including calibration shift, short life, limited application, high cost, etc.

The object of this invention, therefore, is to provide a relatively low cost pneumatic transmitter having a substantially reduced susceptibility to mechanical wear and the required stability for use in a wide variety of environmental applications.

One feature of this invention is the provision of a pneumatic transmitter apparatus having a condition responsive vane member movable between axially aligned discharge and collector nozzles which are spring mounted for movement relative to the vane member in dependence upon the pressure in the collector nozzle. This arrangement provides an error detecting pneumatic transmitter which is extremely rugged in use and highly insensitive to mechanical vibrations.

Another feature of this invention is the provision of a pneumatic transmitter apparatus of the above featured type wherein the vane member is attached for movement with a pressure responsive Bourdon spring thereby providing an instrument in which all critically movable parts are spring mounted for extremely stable operation.

Another feature of this invention is the provision of a pneumatic transmitter apparatus of the above featured types wherein the axially aligned discharge and collector nozzles are mounted on a cantilevered leaf spring against which a laterally directed force is applied by a pneumatic actuator responsive to the pressure in the collector nozzle. This arrangement permits the device to function as a force balanced error detector which measures differences in the positions of the vane member and associated nozzle elements.

Another feature of this invention is the provision of a pneumatic transmitter apparatus of the above featured type including a fulcrum element which exerts upon the leaf spring an oppositely directed force of that furnished by the pneumatic actuator and is adjustable longitudinally of the leaf spring between its cantilever base and the pneumatic actuator. This fulcrum element allows range adjustment of the device by controlled variation of the leaf spring's flexibility.

Another feature of this invention is the provision of a pneumatic transmitter appraatus of the above featured type wherein the fulcrum element includes a flexible disc in tangential contact with the leaf spring so as to exert the force in opposition to that provided by the pneumatic actuator. The flexible fulcrum disc is adapted to flex in response to changes in the radius of curvature of the leaf spring thereby maintaining a given line of contact therewith and preventing deterioration of performance repeatability.

Another feature of this invention is the provision of a pneumatic transmitter apparatus of the above featured types including an adjustable biasing spring connected to the Bourdon spring and adapted to permit variation of the instrument's pressure response range.

Another feature of this invention is the provision of a pneumatic transmitter apparatus of the above featured types wherein the Bourdon spring is a C-shaped Bourdon tube mounted laterally adjacent the leaf spring member so as to provide movement of the attached vane member along a curved path which is substantially parallel to the curved paths of movement of the collector and discharge nozzles. This arrangement permits extremely compact mounting of the various components and prevents longitudinal separation of the vane member and associated nozzles during movements thereof.

Another feature of this invention is the provision of a pneumatic transmitter apparatus of the above featured types including a bimetallic element connected between the leaf spring and supported nozzles. The bimetallic element improves accuracy of the instrument by compensating for undesirable relative movement which might occur between the vane member and associated nozzles because of changes in ambient temperature.

Another feature of this invention is the provision of a pneumatic transmitter apparatus of the above featured types including an indicating dial mounted adjacent the Bourdon tube and a pointer element mechanically connected to the Bourdon tube and adapted to indicate movement thereof on the indicating dial. This device provides a locational indication of the sensed variable condition in addition to the proportional collector nozzle error signal which can be transmitted to a remote position.

Another feature of this invention is the provision of a pneumatic transmitter apparatus of the above featured types wherein the collector nozzle is conically shaped so as to inhibit undesirable nozzle clogging which could result from an accumulation of dirt particles.

These and other objects and features of the present invention will become more apparent upon a perusal of the following specification taken in conjunction with the accompanying drawings wherein.

Figure 1:
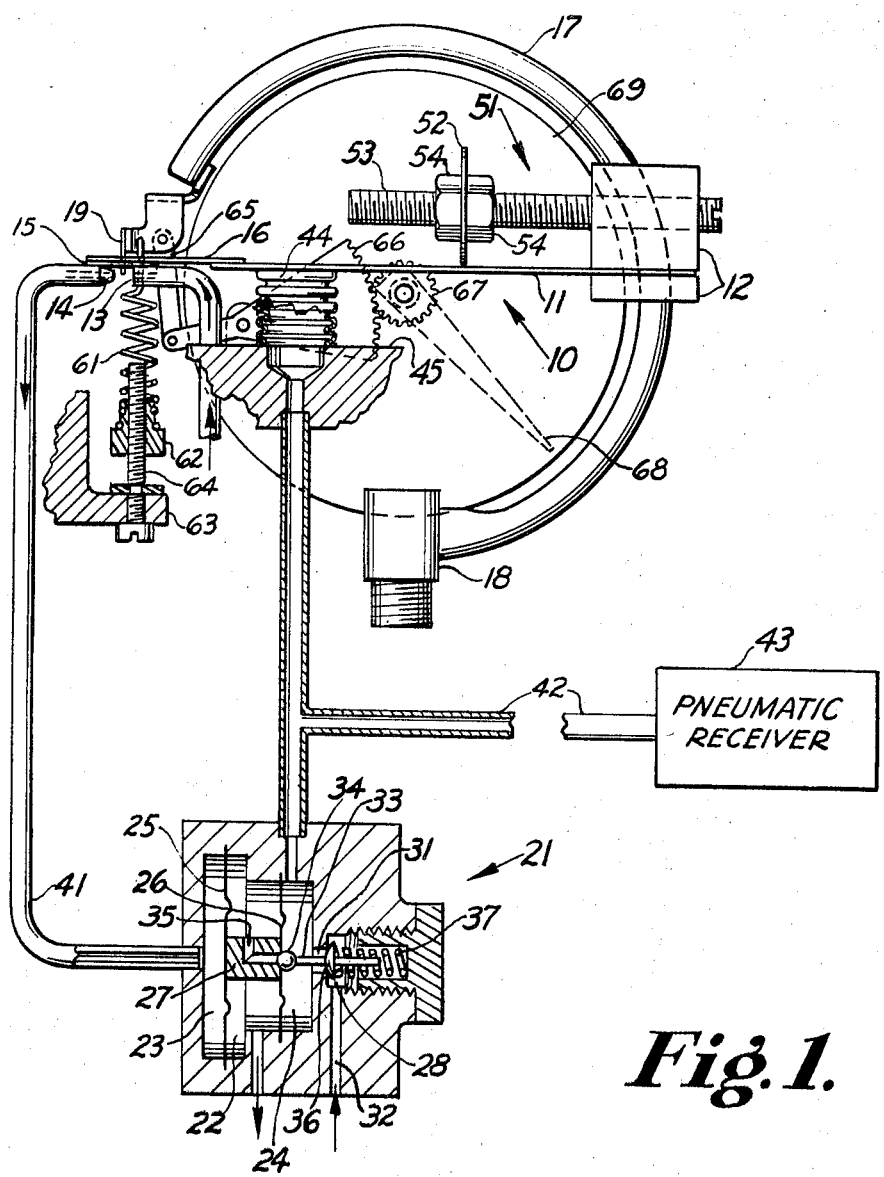
FIG. 1 is a partial schematic rear view of a preferred embodiment of the invention.
Figure 2:
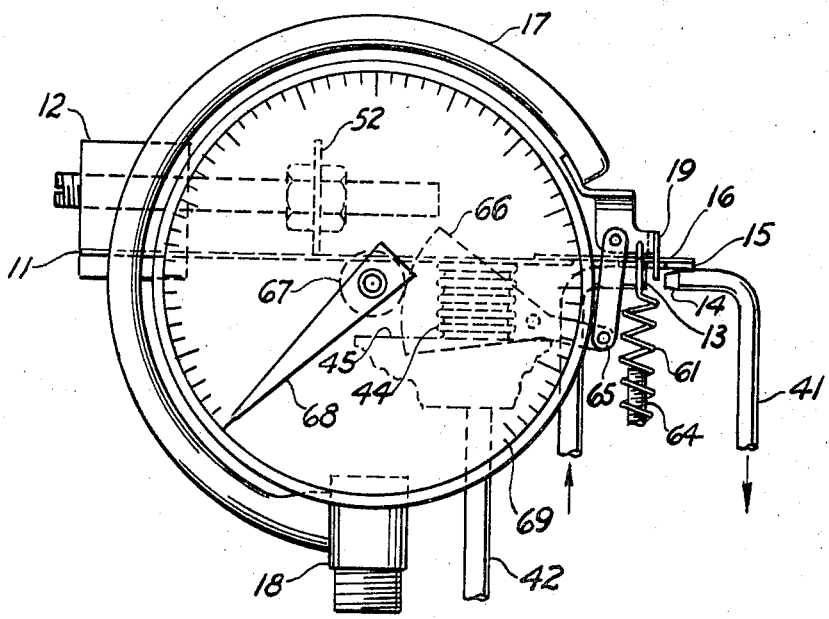
FIG. 2 is a partial schematic front view of the device shown in FIG. 1.
Figure 3:
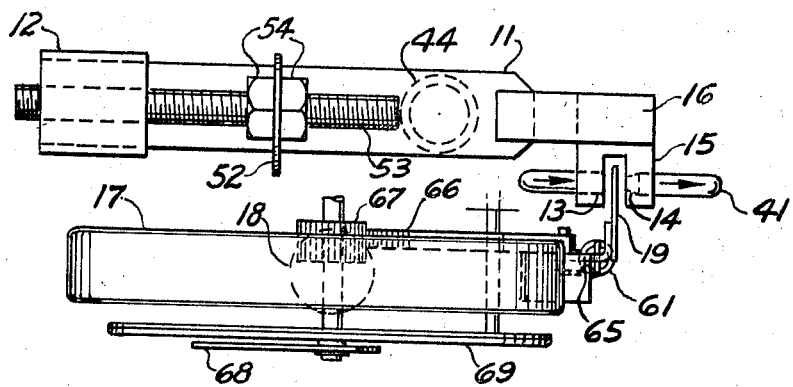
FIG. 3 is a partial schematic plan view of the device shown in FIGS. 1 and 2.

Referring to the drawings there is shown the feedback assembly 10 including the cantilevered, elongated leaf spring 11 fixed at one end of the base 12. Supporting the axially aligned discharge nozzle 13 and collector nozzle 14 on the free end of the leaf spring 11 is the slotted plate 15 and connecting bimetal element 16. The C-shaped Bourdon tube 17 is mounted laterally adjacent the leaf spring 11 and is connected at one end to the socket 18. Attached to the opposite end of the Bourdon tube 17 is the vane member 19 which extends into the slot in the plate 15 and into the gap between the spaced apart discharge nozzle 13 and collector nozzle 14.

The pilot relay 21 includes the atmospheric pressure chamber 22 located between and separated from the control chamber 23 and the valve chamber 24 by the flexible diaphragms 25 and 26 which are mechanically joined by the diaphragm spacer 27. The valve supply chamber 28 communicates through the aperture 31 with the valve chamber 24 and through the passage 32 with a source of fluid pressure (not shown). At opposite ends of the valve stem 33 are the ball valve 34 which seats against the spacer 27 to close a passage 35 into the atmospheric pressure chamber 22 and the semi-spherical valve 36 which is biased by the spring 37 into a closed position sealing the aperture 31. The tube 41 connects the collector nozzle 14 to the control chamber 23 and the tube 42 connects the valve chamber 24 with a remotely located pneumatic receiver 43. Also connected to the valve chamber 24 is the pneumatic actuator bellows 44 having one end fixed to the base 45 and an opposite end fixed to the free end of the cantilevered leaf spring 11.

The leaf spring adjustment mechanism 51 includes the fulcrum disc 52 adjustably secured by the jam nuts 54 to the threaded rod 53 which is secured to the cantilever base 12. The disc 52 is in tangential contact with the leaf spring 11 so as to exert thereon a force opposite to that provided by the bellows actuator 44.

As shown in FIG. 1, the biasing spring 61 is connected between the free end of the Bourdon tube 17 and the bushing 62 which is adjustably fixed to the support 63 by the suppression screw 64. Also attached to the free end of the Bourdon tube 17 is one end of a link 65, the other end of which is pivotally connected to one end of the centrally pivoted arm 66. The opposite end of the arm 66 has gear teeth which engage the spur gear 67 attached for rotation with the pointer 68. Mounted parallel to the Bourdon tube 17 is the indicating dial 69 which cooperates with the pointer 68 to indicate the position of the free end of the Bourdon tube 17.

For typical operation of the invention, the socket 18 is connected to a source of fluid pressure which is to be sensed. Changes in this pressure produce the well known flexing of the Bourdon tube 17. Bourdon tube movement causes the attached vane member 19 to move between the discharge and collecting nozzles 13 and 14 in a direction transverse to their axis so as to interrupt more or less of the air stream therebetween. The resultant change in pressure within the collector nozzle 14 is amplified and transmitted by the pilot relay 21 to the pneumatic receiver 43 which either provides an indication of the change in the condition sensed by the Bourdon tube 17 or effects a control function in response thereto. The modified collector nozzle pressure is also transmitted to the actuator bellows 44 which expands or contracts moving the leaf spring and attached nozzles 13 and 14 until an equilibrium relative position between the vane member 19 and the nozzles is obtained. For example, assuming a pressure change which produces an upward movement of the Bourdon tube 17 and attached vane member 19, less air directed by the discharge nozzle 13 toward the collector nozzle 14 will be interrupted and the collector nozzle pressure will rise. The corresponding pressure rise in the control chamber 23 will exert an increased force against the diaphragm 25 and attached spacer 27 forcing the valve 36 to open and allowing supply air to enter the valve chamber 24 which transmits the increased pressure signal to pneumatic receiver 43. Simultaneously, the actuating increased pressure will expand the bellows 44 exerting a greater force against the leaf spring 11. This increased force will deflect the spring and attached nozzles upwardly toward the new vane position until an equilibrium pressure is again attained. Conversely, a change in the pressure sensed by the Bourdon tube 17 causing a downward movement of the vane member 19 will increase flow interruption between the nozzles reducing collector nozzle pressure. Because of the corresponding pressure reduction in the control chamber 23, a relatively greater force will be exerted against the diaphragm 25 by the pressure in chamber 24. This will cause movement of the diaphragms 25 and 26 and the attached spacer 27, opening the passage 35 and allowing discharge of pressure from the valve chamber 24. The resultant decrease in pressure will be transmitted to the pneumatic receiver 43 and to the actuating bellows 44 causing contraction thereof. This will deflect the leaf spring 11 downwardly and move the nozzles 13 and 14 into a new position wherein the equilibrium relative position between the nozzles and vane 19 again is attained.

To establish a desired pressure response range for the instrument, the fulcrum disc 52 can be adjusted longitudinally of the leaf spring so as to vary the flexibility thereof. However, since the leaf spring under load assumes a curved shape while the distance between the disc 52 and the cantilever base 12 remains constant, there would occur normally between the disc and the spring a sliding effect which would cause deterioration of performance repeatability. Accordingly, an important feature of this invention is the preferred use of a relatively thin flexible disc which will flex during movement of the leaf spring 11 to maintain a given line of contact therewith. For example only, a disc made of beryllium copper having a thickness of 0.025 inch has been found suitable for this application.

The biasing spring 61 is used in applications wherein an extension of the instrument's upper pressure response range is desired. By turning the suppression screw 64, the bushing 62 and lower end of attached spring 61 can be moved downwardly increasing the load on the free end of the Bourdon tube 17. In this way, a desired zero position of, for example only, 3 pounds per square inch (p.s.i.) output pressure can be established for a substantially greater base input pressure thereby extending the upper response range of the transmitter. However, after such an adjustment the relatively high suppression forces existing in the biasing spring 61 and the Bourdon tube 17 can vary substantially with different ambient temperatures because of changes in the elastic moduli of the Bourdon tube and the suppression spring. This factor coupled with the relatively small movements used to activate the transmitter can result in significant errors upon relatively small changes in ambient temperature. Therefore, it is preferable that the position of the free end of the loaded Bourdon tube at zero position be made identical to its position with no input pressure and no spring load. This establishes most of the load on the biasing spring 61 so that ambient temperature changes affect only the biasing spring itself and if a spring material is selected whose elastic modulus does not change appreciably with temperature, modulus errors will be eliminated.

The bimetal element 16 connecting the leaf spring 11 and the nozzles 13 and 14 functions to compensate for the normally expected part expansions and contractions which would change the relative position between the vane member 19 and the nozzles 13, 14. Accordingly, errors which would result therefrom are eliminated. A further improvement in accuracy is obtained by selecting a bellows actuator 44 having a low spring rate relative to that of the leaf spring 11. In this way, one minimizes the undesirable effects of non-linearity and mechanical hysteresis in the bellows actuator.

Obviously, many modifications and variations of the present invention are possible in light of the above teachings. It is, therefore, to be understood that within the scope of the appended claims the invention may be practiced otherwise than as specifically described.

What is claimed is:

1. A pneumatic system apparatus comprising a discharge nozzle adapted for connection to a source of fluid pressure, a collector nozzle spaced from and axially aligned with said discharge nozzle, a vane member mounted between said discharge and collector nozzles and adapted to interrupt fluid flow therebetween, said vane member being adapted for movement transverse to the axis of said discharge and collector nozzles in response to changes in a variable condition, movable mounting means supporting said discharge and collector nozzles and adapted to permit movement thereof in a direction substantially parallel to the direction of movement of said vane member, said movable mounting means comprising a spring member having one end secured to a base and another end attached to for support of said discharge and collector nozzles, pneumatic actuator means mechanically connected to said spring member and pneumatically connected to said collector nozzle, said actuator means adapted to exert a movement producing force on said spring member in response to collector nozzle pressure changes caused by movement of said vane member and connection means communicating in operative relation with the pressure in said collector nozzle enabling connection thereat of remotely operative equipment.

2. A pneumatic system apparatus according to claim 1 including a pneumatic receiver means operatively connected to said collector nozzle and adapted to be responsive to the pressure therein.

3. A pneumatic system apparatus according to claim 1 wherein said collector nozzle is conically shaped.

4. A pneumatic system apparatus according to claim 1 wherein said spring member is a cantilevered leaf spring and said actuator means is adapted to exert a laterally directed force on said leaf spring.

5. A pneumatic system apparatus according to claim 1 including a Bourdon tube connnected to said vane member so as to produce movement thereof in response to a variable condition sensed by said Bourdon tube.

6. A pneumatic system apparatus according to claim 5 including an adjustable biasing spring connected to the end of said Bourdon tube.

7. A pneumatic system apparatus according to claim 5 wherein said spring member is an elongated element, said Bourdon tube is mounted laterally adjacent said elongated spring member, said spring member is adapted to provide movement of said collector and discharge nozzles along curved paths, and said Bourdon tube is adapted to produce movement of said vane member along a curved path substantially parallel to the paths of said collector and discharge nozzles.

8. A pneumatic system apparatus according to claim 7 wherein said spring member is a cantilevered leaf spring and said actuator means is adapted to exert a laterally directed force on said leaf spring.

9. A pneumatic system apparatus according to claim 5 including dial means mounted adjacent said Bourdon tube, and pointer means mechanically connected to said Bourdon tube and adapted to indicate on said dial means movement of said Bourdon tube produced by changes in a variable condition sensed thereby.

10. A pneumatic system apparatus comprising a discharge nozzle adapted for connection to a source of fluid pressure, a collector nozzle spaced from and axially aligned with said discharge nozzle, a vane member mounted between said discharge and collector nozzles and adapted to interrupt fluid flow therebetween, said vane member being adapted for movement transverse to the axis of said discharge and collector nozzles in response to changes in a variable condition, movable mounting means supporting said discharge and collector nozzles and adapted to permit movement thereof in a direction substantially parallel to the direction of movement of said vane member, said movable mounting means comprising a cantilevered leaf spring member having one end secured to a base and another end attached to for support of said discharge and collector nozzles, pneumatic actuator means mechanically connected to said spring member between said base and said nozzles and pneumatically connected to said collector nozzle, said actuator means adapted to exert a laterally directed movement producing force on said leaf spring member in response to collector nozzle pressure changes caused by movement of said vane member and an adjustment means for adjusting the flexibility of said leaf spring means.

11. A pneumatic system apparatus according to claim 10 including a Bourdon tube connected to said vane member so as to produce movement thereof in response to a variable condition sensed by said Bourdon tube.

12. A pneumatic system apparatus according to claim 11 wherein said Bourdon tube is mounted laterally adjacent said cantilevered spring member, said spring member is adapted to provide movement of said collector and discharge nozzles along curved paths, and said Bourdon tube is adapted to produce movement of said vane member along a curved path substantially parallel to the paths of said collector and discharge nozzles.

13. A pneumatic system apparatus according to claim 12 wherein said adjustment means comprises a fulcrum which exerts on said leaf spring a force in a direction opposite to the force exerted by said pneumatic actuator means and which is adjustable longitudinally of said leaf spring between said base and said pneumatic actuator means.

14. A pneumatic system apparatus according to claim 13 wherein said fulcrum comprises a flexible disc in tangential contact with said leaf spring and adapted to flex and maintain a given line of contact with said leaf spring upon deflection thereof produced by said pneumatic actuator means.

15. A pneumatic system apparatus according to claim 14 wherein said movable mounting means further comprises a bimetallic element connected between said leaf spring and said nozzles and adapted to compensate ambient thermally induced relative movement between said nozzles and said vane member.

16. A pneumatic system apparatus according to claim 10 wherein said adjustment means comprises a fulcrum which exerts on said leaf spring a force in a direction opposite to the force exerted by said pneumatic actuator means and which is adjustable longitudinally of said leaf spring between said base and said pneumatic actuator means.

17. A pneumatic system apparatus according to claim 16 wherein said fulcrum comprises a flexible disc in tangential contact with said leaf spring and adapted to flex and maintain a given line of contact with said leaf spring upon deflection thereof produced by said pneumatic actuator means.

18. A pneumatic system apparatus comprising a discharge nozzle adapted for connection to a source of fluid pressure, a collector nozzle spaced from and axially aligned with said discharge nozzle, a vane member mounted between said discharge and collector nozzles and adapted to interrupt fluid flow therebetween, said vane member being adapted for movement transverse to the axis of said discharge and collector nozzles in response to changes in a variable condition, movable mounting means supporting said discharge and collector nozzles and adapted to permit movement thereof in a direction substantially parallel to the direction of movement of said vane member, said movable mounting means comprising a spring member having one end secured to a base and another end attached to a bimetallic element for support of said discharge and collector nozzles, said bimetallic element being adapted to compensate for ambient thermally induced relative movement between said nozzles and said vane member, and pneumatic actuator means mechanically connected to said spring member between said base and said nozzles and pneumatically connected to said collector nozzle, said actuator means adapted to exert a movement producing force on said spring member in response to collector nozzle pressure changes caused by movement of said vane member.

References Cited

UNITED STATES PATENTS

| | | | |
|---|---|---|---|
| 1,809,898 | 6/1931 | Heise | 73—368.6 |
| 2,268,783 | 1/1942 | Tate | 137—85 |
| 2,921,595 | 1/1960 | Erbguth | 137—85 |
| 2,921,596 | 1/1960 | Erbguth | 137—85 |

LOUIS R. PRINCE, *Primary Examiner.*

D. E. CORR, *Assistant Examiner.*